(12) United States Patent
Bauer et al.

(10) Patent No.: US 7,723,884 B2
(45) Date of Patent: May 25, 2010

(54) PERMANENT MAGNETIC MOTOR HAVING A MAGNETIC AXIAL BEARING

(75) Inventors: Martin Bauer, Villingen-Schwenningen (DE); Vladimir V. Popov, Villingen-Schwenningen (DE); Frank Brechtefeld, Villingen-Schwenningen (DE)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 12/221,882

(22) Filed: Aug. 7, 2008

(65) Prior Publication Data

US 2009/0051240 A1 Feb. 26, 2009

(30) Foreign Application Priority Data

Aug. 24, 2007 (DE) .................. 10 2007 040 018

(51) Int. Cl.
*H02K 7/09* (2006.01)
*H02K 7/18* (2006.01)

(52) U.S. Cl. ................ 310/90.5; 310/156.04; 310/67 R

(58) Field of Classification Search ............ 310/156.04, 310/90.5, 67 R; 360/98.07, 99.04, 99.08
See application file for complete search history.

(56) References Cited

U.S. PATENT DOCUMENTS 5,457,086 A   10/1995  Rigney
5,623,382 A * 4/1997  Moritan et al. ........... 360/99.08
6,081,057 A * 6/2000  Tanaka et al. .................. 310/90
6,841,902 B2 * 1/2005  Wang et al. ................ 310/67 R
7,138,740 B2 * 11/2006 Mizutani et al. ........... 310/90.5
2006/0091750 A1  5/2006  Wang
2007/0001531 A1 * 1/2007  Nagai ..................... 310/156.04
2007/0013255 A1 * 1/2007  Wakitani et al. ............ 310/216
2007/0063604 A1  3/2007  Shimada

FOREIGN PATENT DOCUMENTS

DE       4038382       6/1992
DE       10358693      7/2005

\* cited by examiner

*Primary Examiner*—Quyen Leung
*Assistant Examiner*—Leda Pham
(74) *Attorney, Agent, or Firm*—Cooper & Dunham LLP

(57) ABSTRACT

A permanent magnetic motor having a magnetic axial bearing and one or more fluid bearings, wherein a stator unit is disposed on a baseplate, the stator unit being disposed opposite a magnet ring made up of permanent magnets and being separated from the magnet ring by an air gap, and the magnet ring is fixed to the inside circumference of a circumferential hub that is supported with respect to a bearing bush by means of the fluid bearings via a shaft, and at least one fluid dynamic axial bearing is preloaded with an axial attractive force component that is at least partly generated by a ferromagnetic pull ring that is fixed to the baseplate and disposed below the magnet ring and permeated by its field lines, characterized in that, seen magnetically, the stator unit is centered with respect to the magnet ring and has no significant axial offset and that the pull ring has no or only relatively low electrical conductivity at high magnetic permeability.

15 Claims, 10 Drawing Sheets

PERMANENT MAGNETIC MOTOR HAVING A MAGNETIC AXIAL BEARING

FIELD OF THE INVENTION

The invention relates to a permanent magnetic motor having a magnetic axial bearing according to the preamble of patent claim 1.

A permanent magnet motor of this kind has been made known from a large number of patents submitted by the same applicant. Reference is made to the permanent magnet motors revealed therein. They are to be fully included in the disclosure of the present invention.

DESCRIPTION OF RELATED PRIOR ART

It is known for this kind of permanent magnet motor to be used with the bearing combination of a fluid bearing and a magnetic axial bearing. The fluid bearing in turn may consist of a bearing combination of one or more axial bearings with one or more radial bearings.

In constructing a permanent magnet motor having a magnetic offset, the permanent magnets, taking the form of a ring, are disposed with respect to the stator at an axial offset to the magnetic center line of the stator. They are therefore offset axially above or below the center line, and the upper region of the permanent magnets protrudes, for example, further beyond the center line than does the lower region.

If an axial bearing, preferably taking the form of a fluid bearing and only acting as a repulsive force, is disposed in the upper region of the shaft, there is the disadvantage that in the non-offset arrangement between the stator and the permanent magnet ring, the fluid bearing is subject to axial stress. Due to the offset, however, a force component is generated that pulls the rotor downwards in the opposite direction.

This is why the axial bearing is preloaded using the offset, thus preventing such disadvantageous consequences. For a motor operated overhead, the bearing preload on the upper axial bearing has to be stronger than the weight force so as to maintain the bearing preload even under varying operating conditions. Thus according to the prior art, the preload on the fluid bearing is achieved using the offset arrangement between the permanent magnet ring and the stator. The design of the offset arrangement is, however, subject to limitations governed by noise emissions: the larger the offset—through axial displacement—is made, the greater are the noise emissions. It would be useful to totally omit the offset and nevertheless provide the axial bearing with an appropriate preload, which of course involves essentially conflicting requirements.

In the prior art, incidentally, two fluid axial bearings or one fluid axial bearing are/is counter-supported using a magnetic axial bearing.

Here, it is also known to form the magnetic axial bearing using the known offset arrangement between the magnet ring and the stator.

In addition, it is known to use a pull plate or a pull ring that supports and intensifies the effect of the magnetic axial bearing. Here, it is known to design these kinds of pull rings as ferromagnetic stainless steel rings. They are formed integrally as one piece. A problem with the known ferromagnetic pull rings, however, is there undesirably high electrical conductivity, resulting in the formation in the pull ring of detrimental eddy currents that lead to unwelcome side effects.

Such unwelcome side effects include the negation of the load-carrying capacity of the axial bearing or at least its lessening, which, for high rotational speeds, is particularly disadvantageous. It is even possible that at high rotational speeds, the undesirable eddy current effects may cause the attractive force of the ferromagnetic pull ring known from the prior art to be weakened, negated or even changed into a repulsive force, which would result in the preload on the fluid dynamic bearing being checked in an undesirable manner.

DISCLOSURE OF THE INVENTION

The invention thus has the object of further developing a permanent magnet motor having a fluid bearing and having a magnetic axial bearing such that lower noise emissions at a favorable preload of the axial bearing can be achieved.

In solving this object, the invention discloses a permanent magnetic motor having a magnetic axial bearing and one or more fluid bearings, wherein a magnet ring made up of permanent magnets is disposed to lie opposite a stator unit and is separated from the stator unit by an air gap and the magnet ring is fixed to the inside circumference of a circumferential hub that is supported with respect to a bearing bush by means of fluid bearings via a shaft, and at least one fluid dynamic axial bearing is preloaded with an axial force component that is at least partly generated by a ferromagnetic pull ring that is disposed below the magnet ring and permeated by its field lines. The motor is characterized in that the pull ring has no or only relatively low electrical conductivity at high magnetic permeability. In a further embodiment of the invention, the stator unit is centered with respect to the magnet ring (hence does not have an axial offset), and the pull ring has no or only relatively low electrical conductivity at high magnetic permeability.

It is important that the above-described offset between the stator unit and the magnet ring, seen as disadvantageous due to noise emissions, can be dispensed with. According to the invention, the pull ring is so designed that it suffices on its own in applying a magnetic attractive force on the axial bearing.

In another embodiment of the invention provision can of course be made for the pull ring—essentially adequate on its own—to be additionally combined with an offset.

Thus according to the invention, the magnetic attractive force of the pull ring is significantly increased. The invention has recognized that eddy currents in the pull ring greatly impair the magnetic effect of the pull ring and moreover result in an undesirable increase in the current consumption of the motor.

Should the pull ring now have no or only relatively low electrical conductivity, undesirable eddy currents will be effectively prevented.

The prevention of eddy currents in the pull ring as aspired to in the present invention, means that the above-mentioned magnetic counter forces on the magnetic axial bearing, which previously resulted in the weakening of the preload on the axial fluid bearing, are either not formed or significantly weakened.

A pull ring is thus proposed that has very high ferromagnetic conductivity and very low electrical conductivity. As a result, very high attractive forces are achieved in the magnetic region and, at the same time, the development of undesirable eddy currents is prevented. This is achieved in that the electrical conducting path in the pull ring is interrupted so that eddy currents do not form or are significantly weakened.

By preventing eddy currents, unwelcome counter forces (magnetic counter forces) are precluded that would result in the above-mentioned undesirable negation of the preload on the axial fluid bearing.

Since eddy current losses are now prevented, due to the special material chosen and the construction of the pull ring, there is now the added advantage that the air gap between the permanent magnet ring and the pull ring can be significantly reduced, because the above-mentioned uncontrollable repulsive and eddy current effects no longer occur, or are at least considerably weakened, and a smaller, more even air gap can now be provided, which, due to the existence of the magnetic effects of the eddy currents was not possible in the prior art.

This produces the further advantage that now the above-described magnetic offset can be totally dispensed with, because, thanks to the small air gap and the high ferromagnetic permeability of the pull ring and the simultaneous prevention of the force effects of eddy currents, the air gap can be made so small that the ferromagnetic effect of the pull ring alone is sufficient to effect the required offset tension on the fluid bearing. A magnetic offset (i.e. an axial offset of the permanent magnet ring vis-à-vis the magnetic center line with respect to the stator) can now be omitted.

The pull ring should thus have high ferromagnetic permeability, low electrical conductivity and low core losses. As a preferred material for this kind of pull ring, a stainless steel material is thus used or a ferruginous material or an iron alloy, ideally it would involve a plastic with integrated ferromagnetic particles (e.g. iron powder) that has no electrical conductivity whatsoever.

Other material compositions include a permalloy or a ferrite material or sintered iron powder or an amorphous magnetic material, such as CoFeNiSiB, CoFeBSi or FeSiBCuNb, also known as Metglas® or Finemet®.

In a preferred embodiment, a ferrite stainless steel SUS-430 is used.

The pull ring is preferably made of at least two rings of differing diameters, one inserted into the other, so as to prevent eddy currents between the ring parts. Here, a radial flow through the rings is prevented since the rings are made of two rings nesting within each other or more than two rings nesting within each other having different diameters.

In another embodiment of the invention it is provided that the pull ring has indentations on its surface (front and back) that penetrate into the material. Thus, due to the compactions in the material of the pull ring, the electrical conductivity is reduced to a significant extent. At the points where the indentations or impressions are provided, there is a local change in electrical conductivity in the sense of a reduction in electrical conductivity, so that in all in all the electrical conductivity of such a pull ring is greatly decreased.

In another embodiment of the present invention, it can be provided that such indentations are pressed or impressed into the pull ring as an annular groove or several annular grooves, and that either one such annular groove is provided in a single ring or that two inter-nested rings of different diameters are disposed on the same plane and the outer ring region of the outer ring is provided with this kind of indentation or similar material alterations.

In a third embodiment of the invention it is provided that a pull ring made of a metal material is used which has open slits oriented inwards in a radial direction and, alternating with these, also has outwards oriented slits distributed about the circumference and at a distance from the inwards oriented slits, it remaining open whether the slits are open or closed towards the outside.

Again with this meander-like arrangement of the surface structure of the pull ring, electrical conductivity of the pull ring in a radial as well as in a tangential direction is effectively prevented. This applies, incidentally, also to the other ring surface structures.

The meander-like incisions could just as well be designed in a different way. Here, indentations could be made in the surface of the pull ring that are preferably offset obliquely and arched with respect to one another and extend at an approximately oblique curve towards the outside. This therefore involves mainly radially oriented grooving created by forming impressions in the surface structure of the pull ring.

Instead of making these kinds of impressions, however, material may also be removed in the same way. Such material removal may be realized using, for example, an ECM process.

The indentations or groovings or material removal may be worked into the surface of the pull ring or they may also penetrate right through the pull ring. It is preferable, however, if an integral, continuous ring structure is maintained.

Regarding the arrangement of the slits or impressions, it is preferable if the slits are disposed in the pull ring such that they are facing away from the permanent magnet i.e. are located on the lower surface.

It is again preferable if the material having the impressed or machined grooves takes the form of the above-mentioned ferromagnetic stainless steel material.

An SUY1 material or an SUY0 material may also be used. Thus, in the general situation, this involves known electrical steel sheet that is altered accordingly in the stated manner.

In another preferred embodiment of the invention, the width of the pull ring may vary along its circumference. The pull ring comprises a number of protruding portions and/or a number of recessed portions on its outer and/or inner circumference. The protruding portions and/or the recessed portions are of the same number as the stator poles. The protruding portions are oriented in the same angular position as the stator poles.

The subject matter of the present invention is not only derived from the subject matter of the individual patent claims but also from any combination of the individual patent claims.

All the details and characteristics revealed in the documents, including the abstract, particularly the spatial designs illustrated in the drawings, are claimed as an essential component of the invention to the extent that they are new with respect to the prior art, either individually or in any combination.

The invention is described in more detail below on the basis of drawings representing only one possible embodiment approach. At the same time, further essential characteristics and advantages of the invention may be derived from the drawings and their description.

BRIEF DESCRIPTION OF THE DRAWINGS

The figures show.

DESCRIPTION OF PREFERRED EMBODIMENTS OF THE INVENTION

Figure 1:
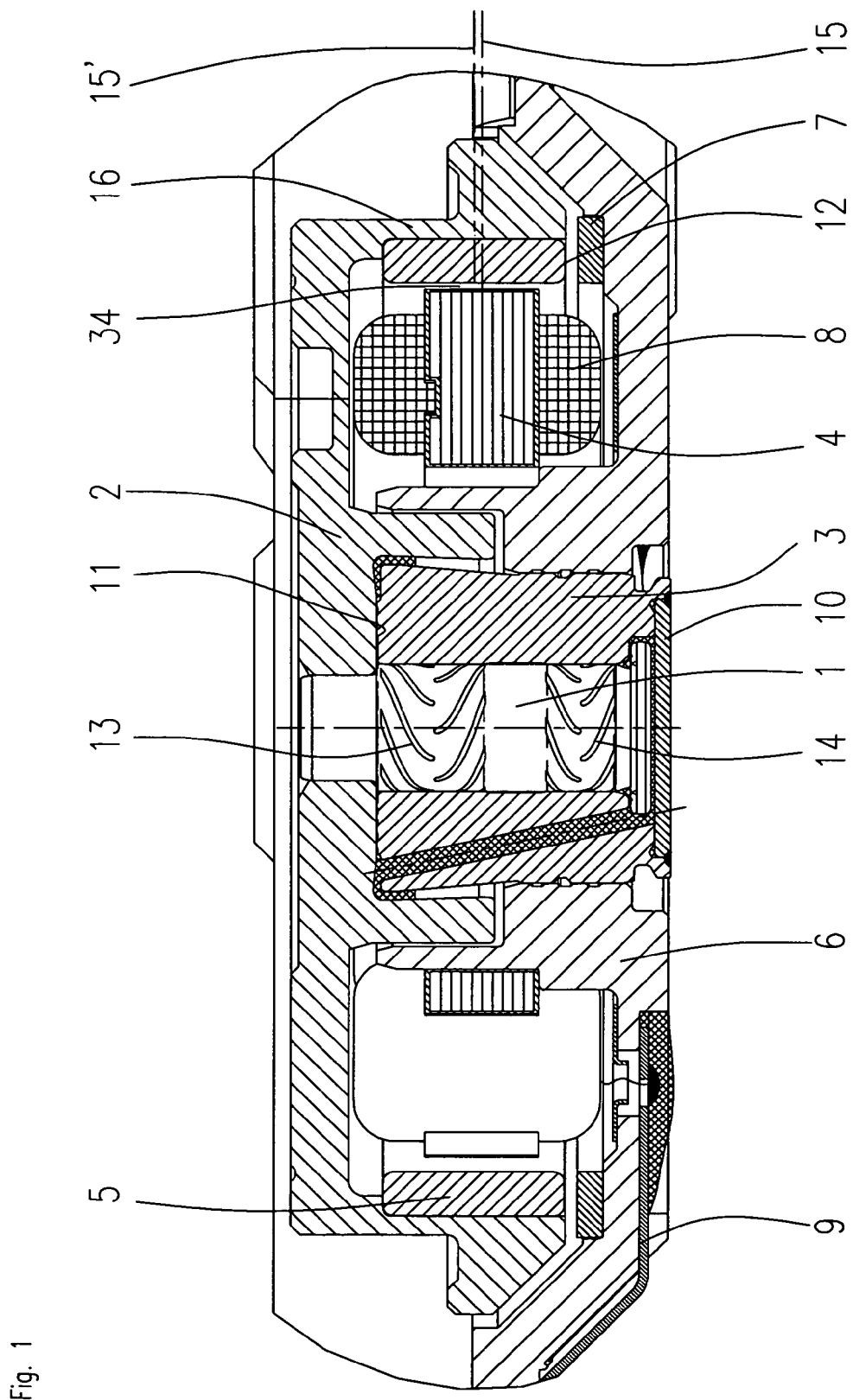
FIG. 1: section through a permanent magnet motor.

The permanent magnet motor according to FIG. 1 consists substantially of a shaft 1 that is fixedly connected to a hub 2. At its inside circumference, the hub 2 carries a magnet ring 5 that comprises individual alternately polarized permanent magnets.

A stator unit 4 is disposed opposite the magnet ring 5 and separated from it by an air gap 34, the stator unit consisting substantially of a laminated sheet metal stack forming a number of stator poles and a winding 8.

The entire stator unit is fixed in the baseplate 6, the shaft 1 being rotatably supported in a bearing bush 3. An upper fluid bearing is formed in the upper region as an axial bearing 11, and two radial bearings 13, 14 are disposed at a distance from one another. Moreover, a magnetic axial bearing 12 is formed that is made up of the pull ring 7 according to the invention and the permanent magnet ring 5. In addition, a magnetic offset may be formed between the permanent magnet ring 5 and the stator unit 4 with respect to the center lines 15, 15' of the stator unit 4 and the rotor magnet ring 5. Here, the magnetic center and the geometric center need not coincide with each other.

Shown also in FIG. 1, is that a printed circuit board 9 is disposed on the baseplate 6. The bearing bush 3 is sealed from below by a counter plate 10.

In the illustrated embodiment of FIG. 1, the yoke ring 16 is formed as a magnetic short circuit for the magnet ring 5 by the magnetic material of the hub 2.

Figure 2:
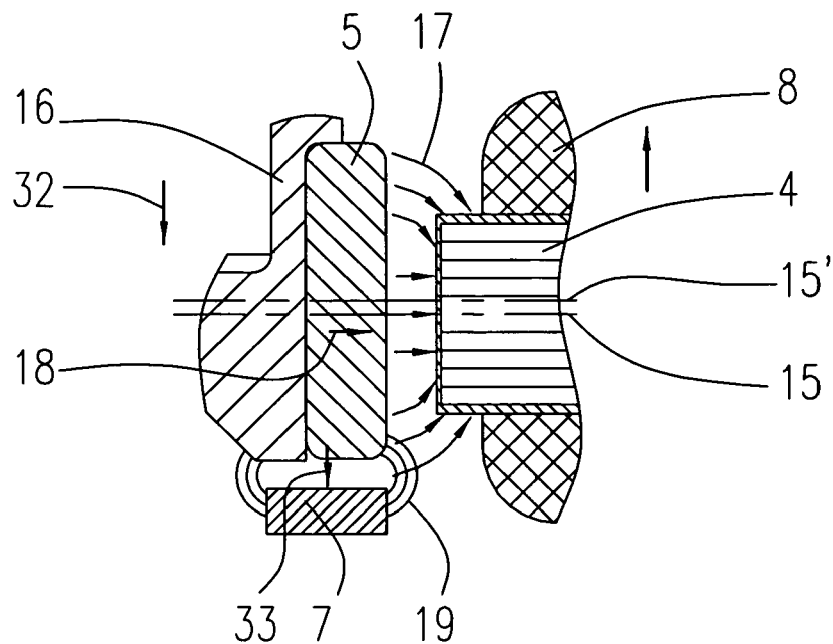
FIG. 2: an enlarged partial view through the magnet ring showing the flux lines in the direction of the stator with illustrated pull ring.
Figure 3:
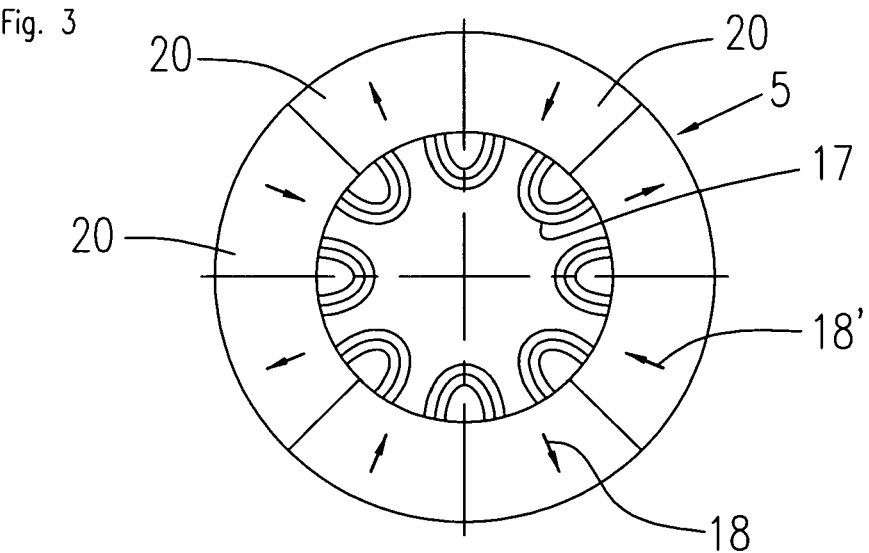
FIG. 3: the top view of the magnet indicating the flux lines of the main flux field.

In FIGS. 2 and 3, a different version is shown in which a separate yoke ring 16 is illustrated, which, however, may also be formed from the material of the hub 2.

FIG. 2 schematically shows the direction of the main magnetic flux that forms in the motor. For a direction of magnetization 18 in the magnet ring 5, a main flux direction having main field lines 17 is formed in the direction of the stator 4.

Here it is assumed that the winding 8 is energized in a specific direction.

It is shown that an offset arrangement exists, in that the center line 15' of the magnet ring 5 is disposed above the center line 15 of the laminated stator stack 4.

On formation of the main field lines 17 in the direction of the stator unit 4, it is unavoidable that additional leakage flux lines 19 that penetrate the pull ring 7 are formed on the underside of the magnet ring 5.

Due to the choice of material of the pull ring according to the invention (high permeability at low electrical conductivity), for the first time it is now possible to largely prevent eddy currents in the pull ring 7, so that a permanent, relatively constant force component acting on the magnet ring 5 in the direction of arrow 33 is generated, the force component pulling the magnet ring 5 downwards. In addition to the axial attractive force in the direction of arrow 32 produced by the magnetic offset, which is in place anyway, the axial attractive force heading in the direction of arrow 33 is generated by the pull ring 7 according to the invention.

In the prior art, the main axial attractive force is mostly generated by the magnetic offset and this induces the axial attractive force in the direction of arrow 32. However, if the magnetic properties of the pull ring are so chosen and the eddy current losses in the pull ring minimized accordingly, the—geometrically required—offset may be omitted and thus also the axial attractive force in the direction of arrow 32. It is then sufficient that the pull ring 7 alone generates a corresponding force component in the direction of arrow 33.

In FIG. 3, the top view of the rotor magnet ring 5 is shown. A plurality of magnetic poles 20 are evenly distributed about the circumference. In the transition region between the differently magnetized magnetic poles, regions are formed, particularly on the underside of the magnet ring, which are particularly responsible for tangentially oriented leakage flux.

Figure 4:
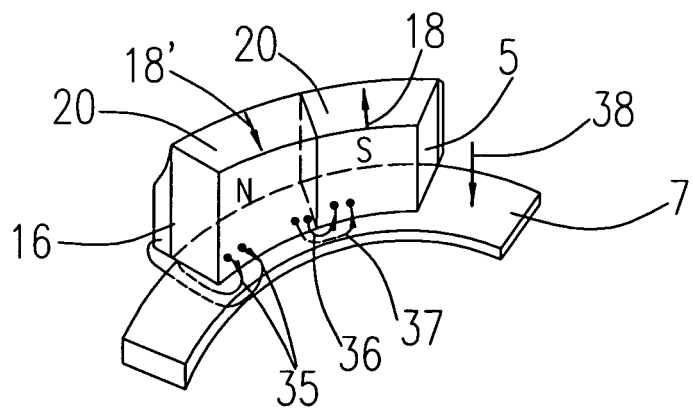
FIG. 4: a schematic partial view of the magnet ring illustrating various flux formations in the direction of the pull ring.

The main field lines 17 are increasingly formed radially inwards, whereby, however, leakage flux takes place as will be explained in more detail on the basis of FIG. 4.

It can be seen that two magnetic poles 20 oppositely magnetized in a radial direction are disposed side by side and that differing leakage flux is formed in the surrounding area and adjacent region of these two magnetic poles 20 polarized in opposite directions.

Leakage flux 35 is formed from the front edge of the left magnetic pole 20, which is polarized north, and flows right through the pull ring 7 in the direction of the yoke 16, which is disposed radially outwards and behind the magnet ring 5.

The second leakage flux 36 is formed in the transition region between the oppositely polarized magnetic poles and forms, as it were, a short circuit leakage flux that is undesirable.

The third leakage flux 37 again goes right through the pull ring 7 and exits from the left magnetic pole, passes through the pull ring 7 in the direction of the circumference and re-emerges from this and enters the right magnetic pole.

It can be seen that leakage flux 35 and 37 in particular penetrate the pull ring 7 and consequently induce magnetization in this pull ring in a specific way and thus generate a force component in the direction of arrow 33.

This is a considerable advantage over the prior art, since now for the first time through the prevention or reduction of eddy current losses in the pull ring 7, a permanently available attractive force (force component 38) can be generated solely in the pull ring 7, which ensures the desired preload of the fluid bearing.

In this way, an attractive effect is generated between the magnet ring 5 and the pull ring 7 that pulls the rotor (the hub 2) downwards.

Figure 5:
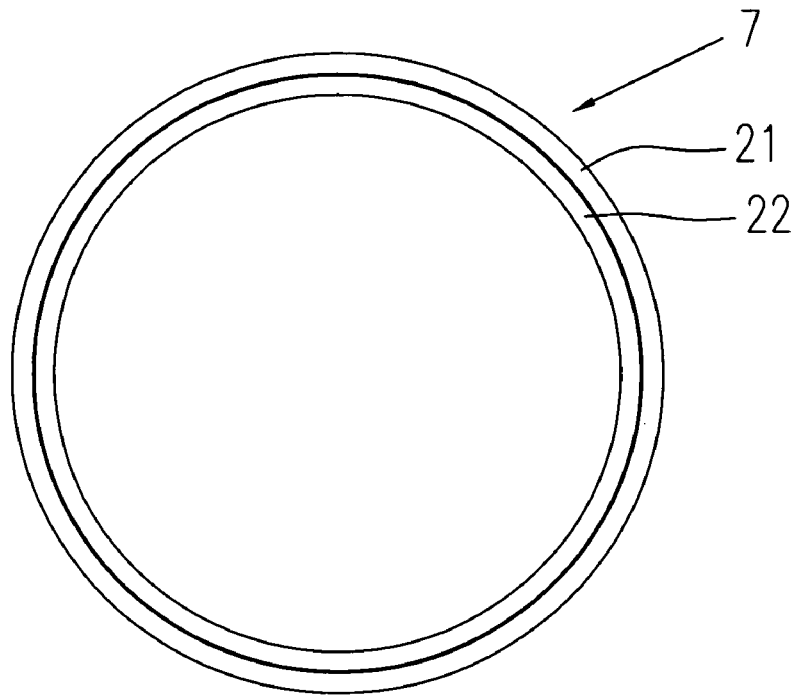
FIG. 5: a first embodiment of a pull ring in a top view.
Figure 6:
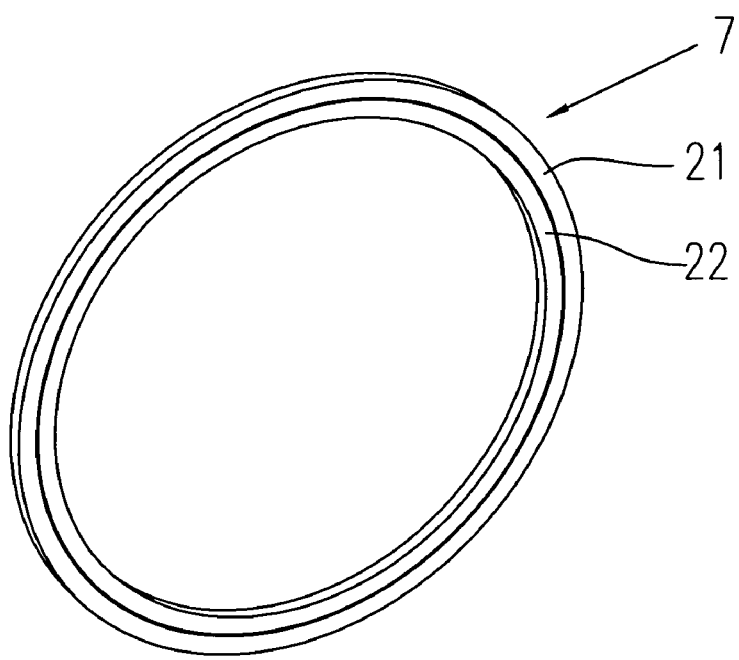
FIG. 6: the pull ring according to FIG. 5 in a perspective view.

In FIGS. 5 and 6, a pull ring 7 is shown as a first embodiment, the pull ring substantially consisting of two ring parts 21, 22 nesting within each other. The ring parts 21, 22 are made of a highly permeable material. The two ring parts 21, 22 are, for example, bonded to each other in order to achieve electrical insulation between the two ring parts. Such an arrangement primarily acts against the eddy currents generated by leakage flux 37.

Figure 7:
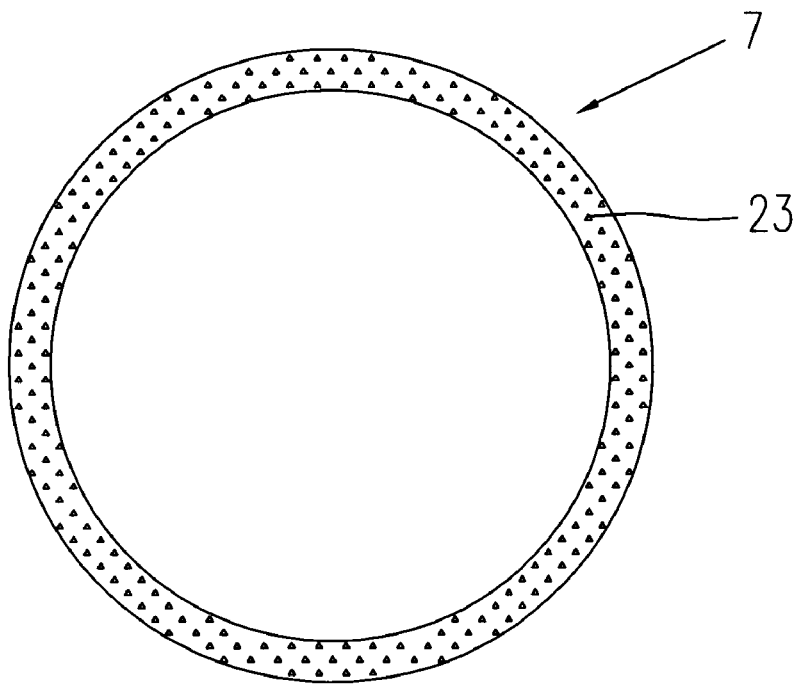
FIG. 7: a second embodiment of a pull ring in a top view.
Figure 8:
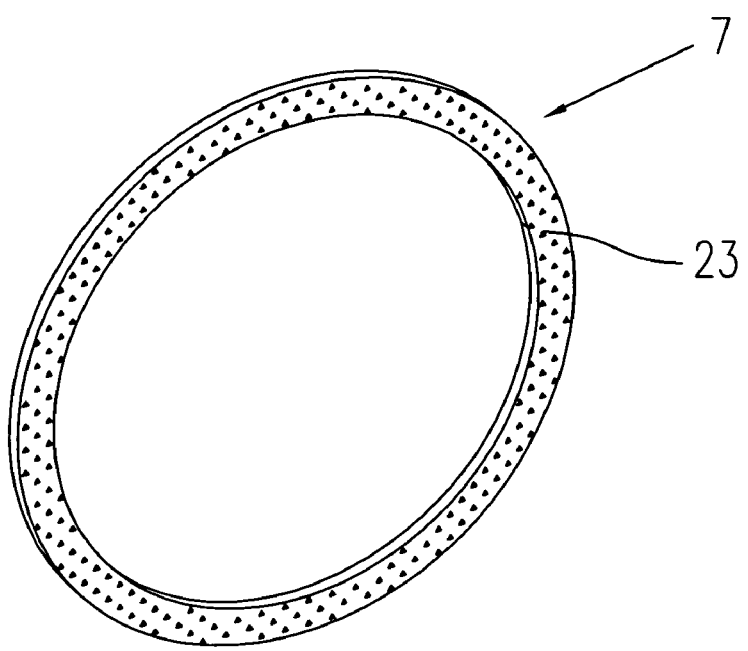
FIG. 8: the pull ring according to FIG. 7 in a perspective view.

In FIGS. 7 and 8, a pull ring 7 is shown as a further embodiment, the pull ring being made of a ferromagnetic material in which a plurality of surface structures 23 are impressed or formed through material removal.

These impressions or moldings are there to reduce the electrical conductivity of the ring 7 overall.

Figure 9:
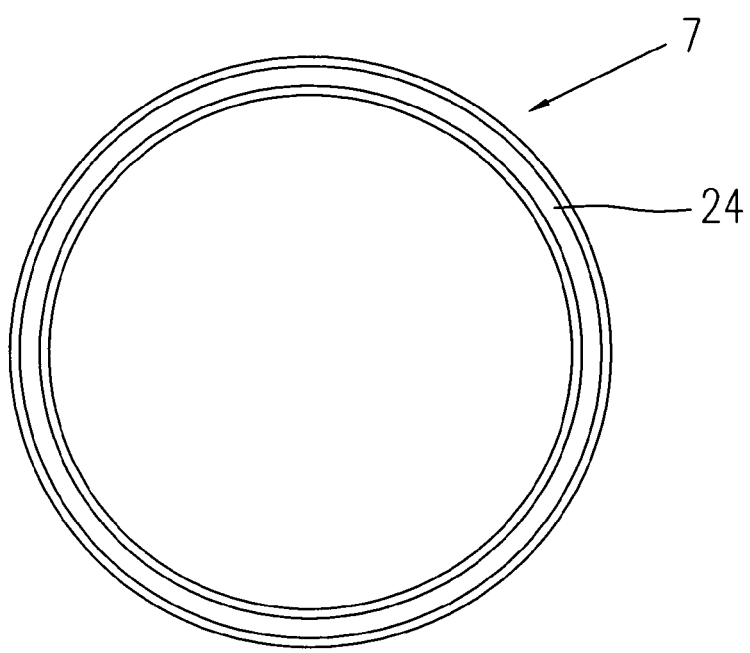
FIG. 9: a third embodiment of a pull ring.
Figure 10:
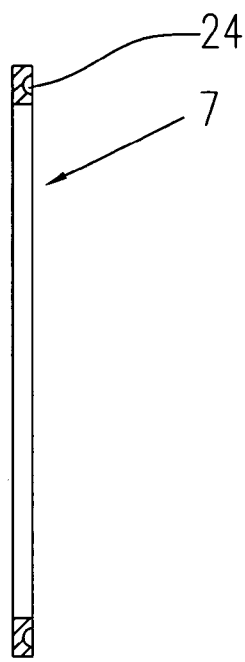
FIG. 10: a section through the pull ring according to FIG. 9.

In FIGS. 9 and 10, a pull ring 7 is shown as a further embodiment, the pull ring carrying an annular groove 24 on one side which is again formed by impression or material removal. By changing the structure of the material in the region of the circumference of the pull ring 7, its electrical conductivity is greatly impaired.

Figure 11:
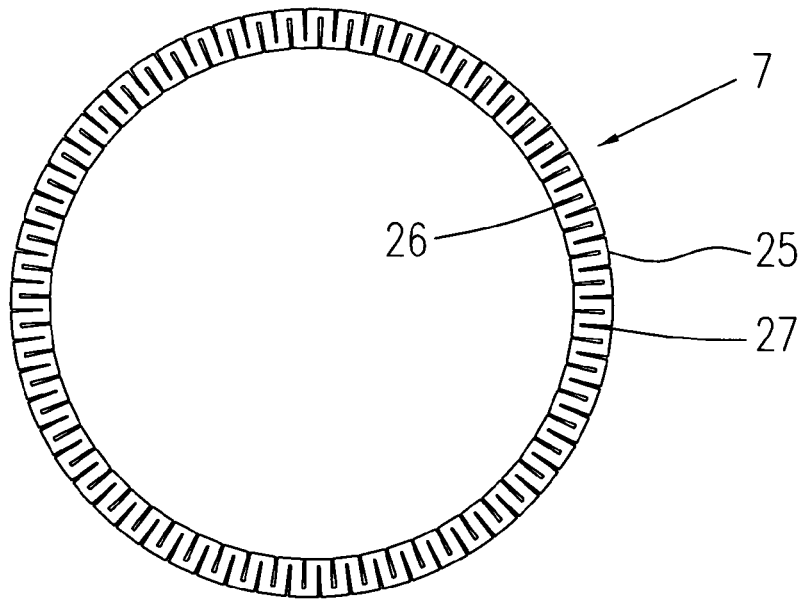
FIG. 11: a fourth embodiment of a pull ring.

FIG. 11 shows a pull ring 7 made of a ring 25 of a ferromagnetic material where slits 26 opening radially inwards alternate with slits 27 opening radially outwards, thus producing a meander-like surface structure. In this way, eddy currents are effectively reduced since the eddy current paths are interrupted.

The slits 26, 27 need not be oriented only radially inwards and outwards; they may also be oriented at an angle with respect to the radial direction.

Figure 17:
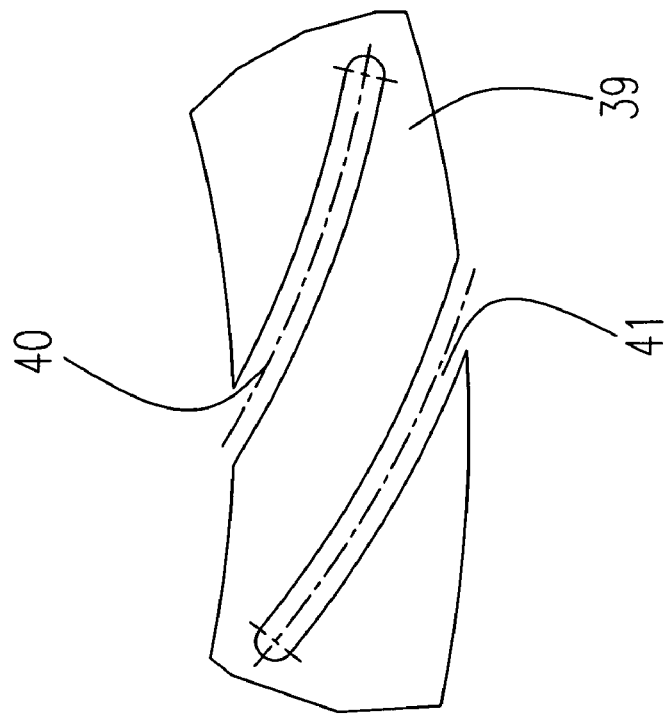
FIG. 17: an enlarged view of the pull ring of FIG. 16.
Figure 16:
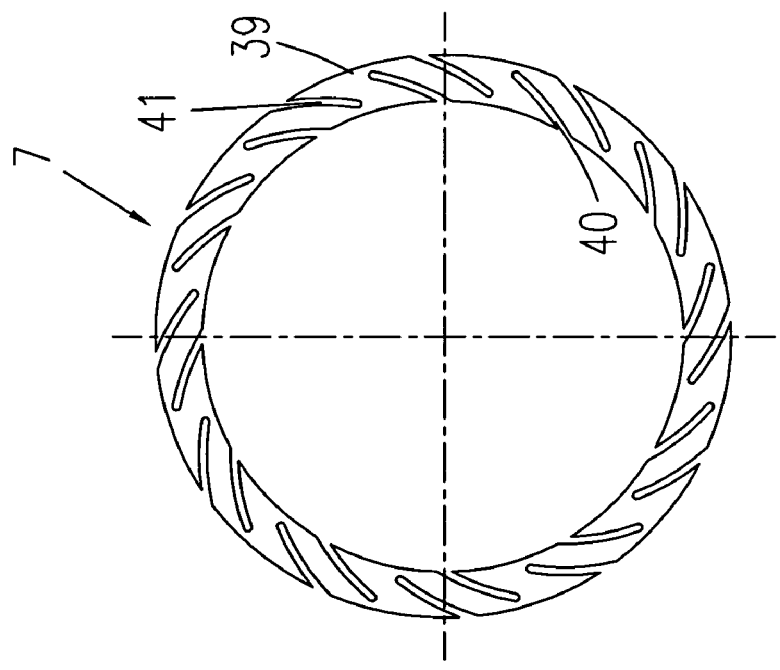
FIG. 16: a seventh embodiment of a pull ring in a top view.

FIGS. 16 and 17 show a pull ring 7 made of a ring 39 of a ferromagnetic material where slits 40 opening at an angle radially inwards alternate with slits 41 opening at an angle radially outwards, thus producing a meander-like surface structure. In this way, eddy currents are effectively reduced since the eddy current paths are interrupted. Compared to the pull ring 7 of FIG. 11, the slits 40, 41 of ring 39 can be made longer (because they are diagonal to the radial direction), thus providing an improved interruption of eddy current paths flowing through the ring 39.

Figure 19:
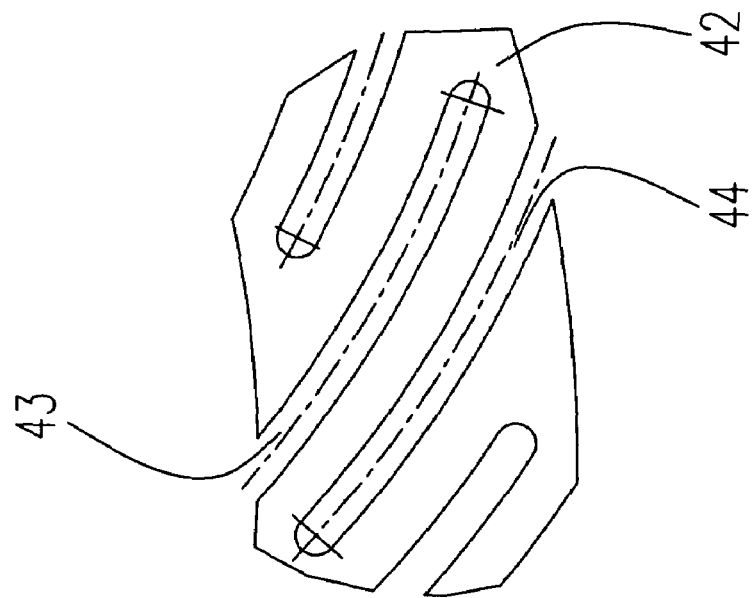
FIG. 19: an enlarged view of the pull ring of FIG. 18.
Figure 18:
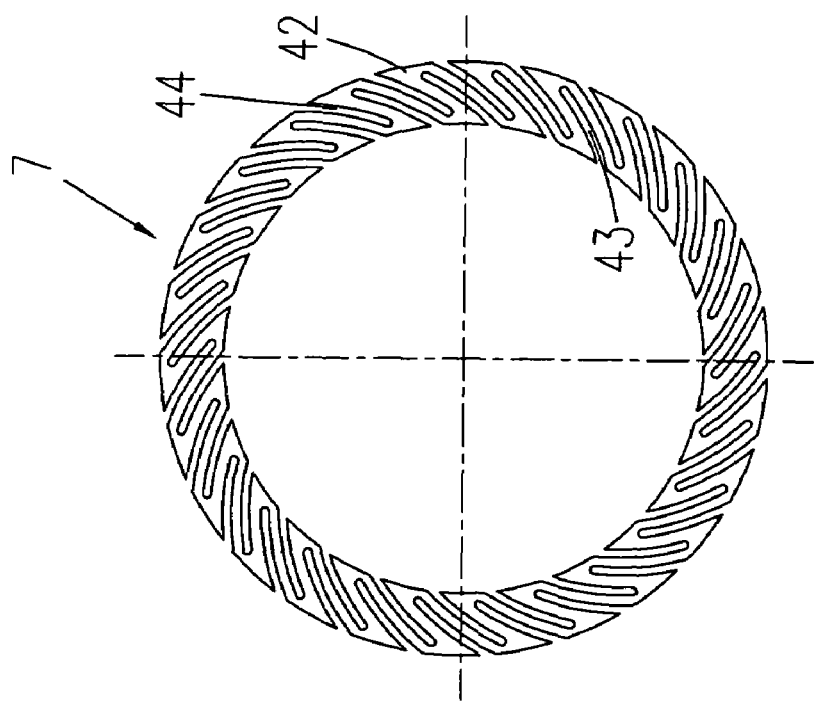
FIG. 18: an eighth embodiment of a pull ring in a top view.

FIGS. 18 and 19 show pull ring 7 made of a ring 42—similar to the ring 39 of FIGS. 16 and 17—having diagonal slits 43 and 44 side by side. The distance of neighboring slits 43 and 44 is much smaller than the distance of the slits shown in FIGS. 16 and 17. This further improves the suppression of eddy currents flowing through the ring 42.

Figure 12:
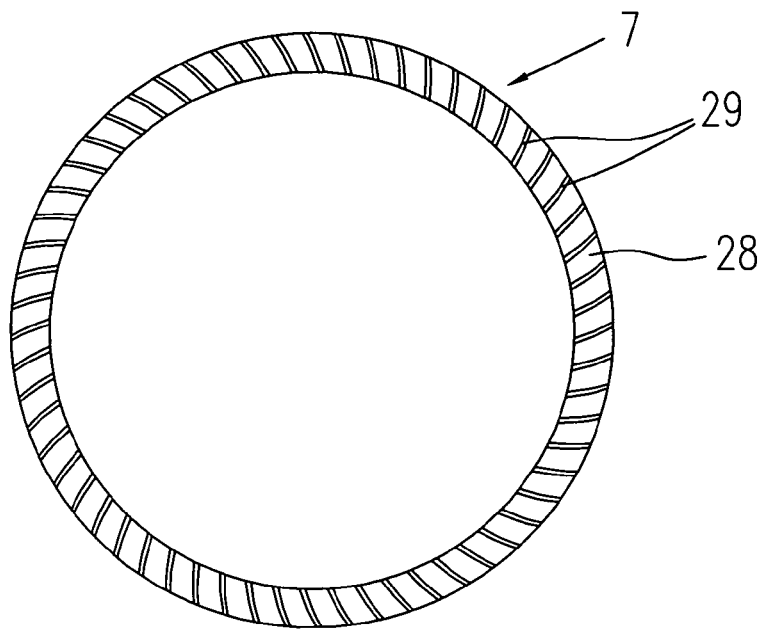
FIG. 12: a fifth embodiment of a pull ring.
Figure 13:
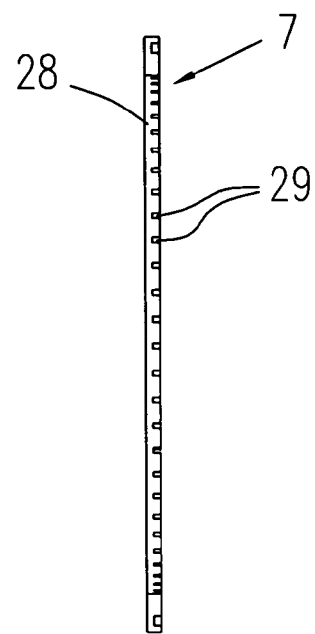
FIG. 13: a section through the pull ring according to FIG. 12.
Figure 14:
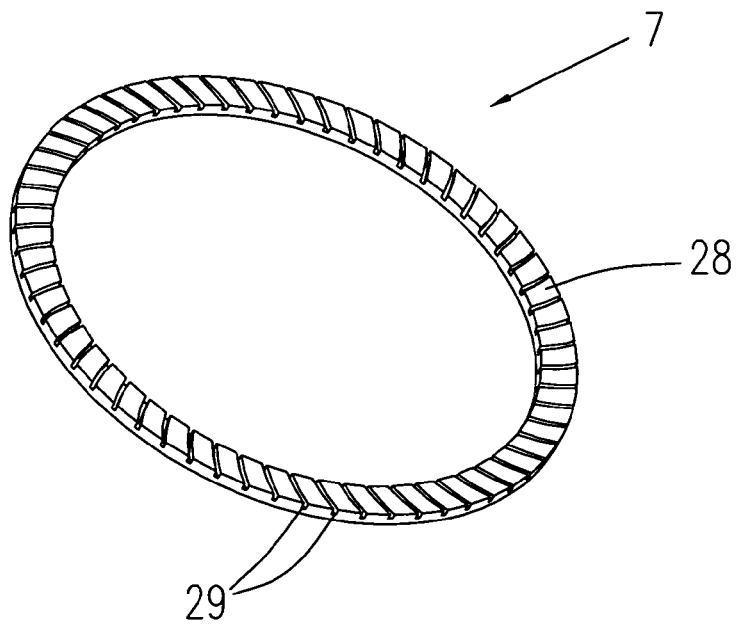
FIG. 14: the perspective view of the pull ring according to FIGS. 12 and 13.

In FIGS. 12 to 14, a pull ring made of a ring 28 is shown as a further embodiment that carries a series of grooves 29 which are formed obliquely and which are either formed by material removal or by impressions. This is shown in more detail in FIG. 14.

The grooves 29 illustrated there could also be made straight. They are then radially oriented.

Figure 15:
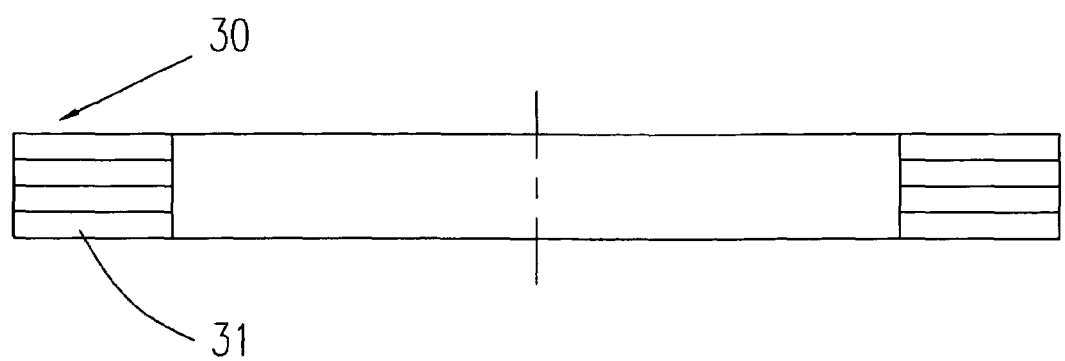
FIG. 15: a sixth embodiment of a pull ring.

In FIG. 15, a layered ring 30 is shown as a further embodiment for a pull ring 7, the layered ring consisting of a stack of ring sections layered one on top of the other. This involves a layered stack 31, where the ring sections are made of a ferromagnetic material, such as an amorphous material or from amorphous steel. It is best if the layered stack is connected using an adhesive or through an electrically non-conductive layer (e.g. a coat of lacquer) on the surface of the ring sections, so that electrical conductivity from one ring section to the next is prevented.

As a preferred embodiment, the inside diameter of such a ring is given, for example, as 17.5 mm and the outside diameter as 20.1 mm, with a thickness of 0.5 mm.

It is of course possible within the scope of technical know-how to give the ring a different profile so as to prevent the formation of eddy currents. For a layered ring using the layered stack 31, the thickness of each individual ring is, for example, 50 micrometers.

With reference to FIGS. 1-4, whenever a magnet pole 20 of the magnet ring 5 lies directly opposite to a stator pole of the motor, the magnetic flux of the magnet pole 20 mainly follows the field lines 17 towards the stator pole and just a small fraction of the magnetic flux is attracted by the pull ring 7 (FIG. 2). When the magnetic pole 20 lies not directly opposite to a stator pole, less magnetic flux flows towards the stator pole but a bigger fraction of the magnetic flux flows towards the pull ring 7. Thus, the attractive force of the magnet ring 5 towards the pull ring 7 varies depending on the position of the magnetic poles 20 of the rotor magnet 5 relative to the stator poles. This may cause vibrations and generates unwanted noise emissions of the motor.

Figure 21:
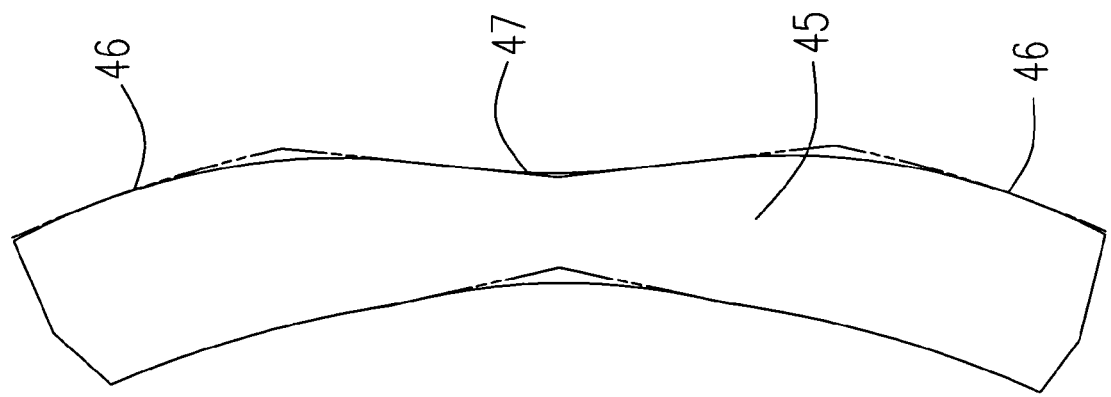
FIG. 21: an enlarged view of the pull ring of FIG. 20.
Figure 20:
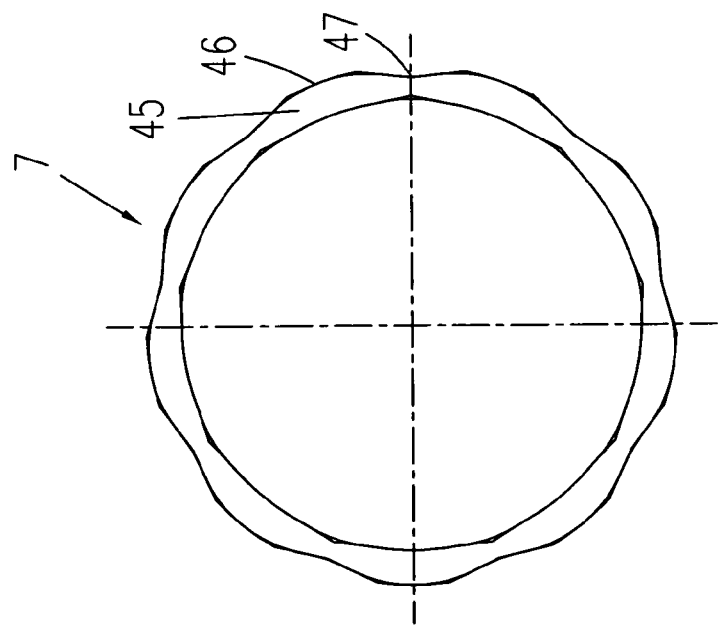
FIG. 20: a ninth embodiment of a pull ring in a top view.

FIGS. 20 and 21 show a pull ring 7 consisting of a ring 45 made of a ferromagnetic material having an undulated outer circumference and/or an undulated inner circumference. Due to the undulated circumference(s) the width of the ring 45 varies along its circumference. The outer circumference of the ring 45 comprises a number of protruding portions 46 alternating with a number of recessed portions 47. The number of each of the protruding and recessed portions 46, 47 corresponds to the number of poles of the stator. For example the motor shown in FIG. 1 is a 3-phase motor having nine stator poles; though the ring 45 comprises nine protruding portions 46 and nine recessed portions 47. The protruding portions 46 are arranged directly beneath (underneath) the stator poles and oriented in the same angular position as the stator poles. The recessed portions 47 are arranged under and between neighboring stator poles. Beneath the stator poles the width of the ring 45 is larger than between the stator poles. Hence, a bigger fraction of the magnetic flux is attracted by the protruding ring portions 46 beneath the stator poles than of the recessed ring portions 47 between the stator poles. Thus, the variations of the attractive force towards the pull ring 45 are balanced and compensated.

The present invention affords the significant advantage that a known noise-generating magnetic offset between the rotor magnet ring and the stator, which goes to form an axial bearing, can now be dispensed with, because now for the first time, by avoiding eddy current losses in the pull ring, it is possible to exert a permanent axial attractive force acting in an axial direction on the hub and hence the magnetic offset in the magnetic axial bearing can be omitted. By omitting the otherwise necessary magnetic offset, the design of the overall motor can be optimized and the stator thus centered at the magnetic center line. Through this symmetric arrangement—now made possible for the first time—time-dependent magnetic forces in an axial direction are consequently prevented and thus undesirable noise emissions.

KEY TO DRAWINGS

1 Shaft
2 Hub
3 Bearing bush
4 Stator unit
5 Magnet ring
6 Baseplate
7 Pull ring
8 Winding
9 Printed circuit board
10 Counter plate
11 Axial bearing (fluid)
12 Axial bearing (magnetic)
13 Radial bearing
14 Radial bearing
15 Center line (magnetic) 15'
16 Yoke ring
17 Main field lines
18 Direction of magnetization
19 Leakage flux lines
20 Magnetic pole
21 Ring part
22 Ring part
23 Surface structure
24 Annular groove
25 Ring
26 Slit
27 Slit
28 Ring 29 Groove
30 Ring
31 Layered stack
32 Direction of arrow
33 Direction of arrow
34 Air gap
35 Leakage flux
36 Leakage flux
37 Leakage flux
38 Force component
39 Ring
40 Slit
41 Slit
42 Ring
43 Slit
44 Slit
45 Ring
46 Protruding portions
47 Recessed portions

The invention claimed is:

1. A permanent magnetic motor having a magnetic axial bearing and one or more fluid bearings (11, 13, 14), wherein a magnet ring (5) made up of permanent magnets is disposed to lie opposite a stator unit (4) and is separated from the stator unit by an air gap and the magnet ring (5) is fixed to the inside circumference of a circumferential hub (2) that is supported with respect to a bearing bush (3) by means of fluid bearings (11, 13, 14) via a shaft (1), and at least one fluid dynamic axial bearing (11) is preloaded with an axial attractive force component that is at least partly generated by a ferromagnetic pull ring (7) that is disposed below the magnet ring (5) and permeated by its field lines, characterized in that the pull ring (7) has no or only relatively low electrical conductivity at high magnetic permeability and a surface structure, (23) formed from impressions or moldings is disposed in the pull ring (7) in order to minimize electrical conductivity.

2. A permanent magnetic motor having a magnetic axial bearing and one or more fluid bearings (11, 13, 14), wherein a magnet ring (5) made up of permanent magnets is disposed to lie opposite a stator unit (4) and is separated from the stator unit by an air gap and the magnet ring (5) is fixed to the inside circumference of a circumferential hub (2) that is supported with respect to a bearing bush (3) by means of fluid bearings (11, 13, 14) via a shaft (1), and at least one fluid dynamic axial bearing (11) is preloaded with an axial attractive force component that is at least partly generated by a ferromagnetic pull ring (7) that is disposed below the magnet ring (5) and permeated by its field lines, characterized in that the pull ring (7) has no or only relatively low electrical conductivity at high magnetic permeability, and the pull ring (7, 25; 39; 42) comprises a meander-like surface structure having radial or diagonal slits (26, 27; 40, 41; 43, 44) opening alternately outwards or inwards.

3. A motor according to one of the claims 1 or 2, characterized in that the stator unit (4) is disposed on a baseplate (6) and the pull ring (7) is fixed to the baseplate (6).

4. A motor according to one of the claims 1 or 2, characterized in that the pull ring (7) alone produces the axial preload on the axial fluid bearing (11).

5. A motor according to one of the claims 1 or 2, characterized in that the pull ring (7) forms no (or only few) eddy currents in the magnetic field.

6. A motor according to one of the claims 1 or 2, characterized in that the pull ring (7) is made of a ferrite stainless steel material or a ferromagnetic iron alloy and the electrical conductivity in the pull ring (7) is greatly reduced.

7. A motor according to one of the claims 1 or 2, characterized in that the pull ring (7) is made of a plastic that contains magnetizable particles.

8. A motor according to one of the claims 1 or 2, characterized in that the pull ring (7) is made of a ferrite material.

9. A motor according to one of the claims 1 or 2, characterized in that the pull ring (7) is made up of two inter-nested ring parts (21, 22) having different diameters and located on the same plane.

10. A permanent magnetic motor having a magnetic axial bearing and one or more fluid bearings (11, 13, 14), wherein a magnet ring (5) made up of permanent magnets is disposed to lie opposite a stator unit (4) and is separated from the stator unit by an air gap and the magnet ring (5) is fixed to the inside circumference of a circumferential hub (2) that is supported with respect to a bearing bush (3) by means of fluid bearings (11, 13, 14) via a shaft (1), and at least one fluid dynamic axial bearing (11) is preloaded with an axial attractive force component that is at least partly generated by a ferromagnetic pull ring (7) that is disposed below the magnet ring (5) and permeated by its field lines, characterized in that the pull ring (7) has no or only relatively low electrical conductivity at high magnetic permeability and one or more annular grooves (24) are formed in the pull ring (7).

11. A permanent magnetic motor having a magnetic axial bearing and one or more fluid bearings (11, 13, 14), wherein a magnet ring (5) made up of permanent magnets is disposed to lie opposite a stator unit (4) and is separated from the stator unit by an air gap and the magnet ring (5) is fixed to the inside circumference of a circumferential hub (2) that is supported with respect to a bearing bush (3) by means of fluid bearings (11, 13, 14) via a shaft (1), and at least one fluid dynamic axial bearing (11) is preloaded with an axial attractive force component that is at least partly generated by a ferromagnetic pull ring (7) that is disposed below the magnet ring (5) and permeated by its field lines, characterized in that the pull ring (7) has no or only relatively low electrical conductivity at high magnetic permeability and the pull ring (7, 30) is made up of a layered stack (31) formed from a plurality of ring sections layered axially one on top of the other, whose bonding is made electrically insulating.

12. A motor according to claim 11, characterized in that the pull ring (7, 28) carries a series of grooves (29) that are disposed obliquely.

13. A motor according to one of the claims 1 or 11, characterized in that the width of the pull ring (7; 45) varies along its circumference.

14. A motor according to claim 13, characterized in that the pull ring (7, 45) comprises a number of protruding portions (46) and/or a number of recessed portions (47) along its outer and/or inner circumference.

15. A motor according to claim 14, characterized in that the number of protruding portions (46) and/or the number of recessed portions (47) correspond to the number of poles of the stator unit (4).

* * * * *